(12) United States Patent
Weatherbee et al.

(10) Patent No.: US 10,317,887 B2
(45) Date of Patent: Jun. 11, 2019

(54) APPARATUS AND METHOD FOR MAINTAINING A MACHINE

(71) Applicant: General Electric Company, Schenectady, NY (US)

(72) Inventors: Paul Weatherbee, Edmonton (CA); Emma Wu, Edmonton (CA)

(73) Assignee: General Electric Company, Schenectady, NY (US)

(*) Notice: Subject to any disclaimer, the term of this patent is extended or adjusted under 35 U.S.C. 154(b) by 289 days.

(21) Appl. No.: 15/372,046

(22) Filed: Dec. 7, 2016

(65) Prior Publication Data

US 2018/0157240 A1     Jun. 7, 2018

(51) Int. Cl.
    *G05B 19/4065*     (2006.01)
    *G05B 19/418*     (2006.01)

(52) U.S. Cl.
    CPC ............ *G05B 19/4184* (2013.01); *G05B 2219/24001* (2013.01); *G05B 2219/24019* (2013.01); *G05B 2219/32226* (2013.01); *G05B 2219/32234* (2013.01); *Y02P 90/14* (2015.11)

(58) Field of Classification Search
CPC combination set(s) only.
See application file for complete search history.

(56) References Cited

U.S. PATENT DOCUMENTS

| | | | | |
|---|---|---|---|---|
| 6,810,406 B2 * | 10/2004 | Schlabach | ........... | B61L 27/0094 |
| 2003/0040826 A1 * | 2/2003 | Hawman | ............... | G06Q 10/06 700/116 |

* cited by examiner

*Primary Examiner* — Cuong B Nguyen
(74) *Attorney, Agent, or Firm* — Fitch, Even, Tabin & Flannery LLP

(57) ABSTRACT

A machine part number of an industrial machine is scanned when the machine enters a facility for maintenance. The scanned number is associated with components that comprise the machine and with characteristics of the components or machine. Based upon the characteristics of the machine or components, a customized maintenance route is produced for the machine through the facility. The customized maintenance route specifies a sequence of maintenance actions and timing of these actions for the machine that are adjusted in real-time as the characteristics change.

12 Claims, 5 Drawing Sheets

APPARATUS AND METHOD FOR MAINTAINING A MACHINE

BACKGROUND OF THE INVENTION

Field of the Invention

The subject matter disclosed herein generally relates to industrial machines and, more specifically, to maintaining these machines.

Brief Description of the Related Art

Various types of industrial and other machines are used to perform various manufacturing and industrial operations and tasks. For instance, some machines are used to create and finish parts associated with wind turbines. Other machines are used to create mechanical parts or components utilized by vehicles. Still other machines are used to produce electrical parts (e.g., resistors, capacitors, and inductors to mention a few examples). In industrial settings, industrial machines may be used for power generation, water treatment, fossil fuel extraction and other endeavors requiring the interoperation of multiple machines in a coordinated and complex manner. Typically, industrial machines are controlled at least in part by computer code (or a computer program) that is executed by a processor that is located at the machine.

As machines are operated over time, the machines need to be maintained. Typically, the machines enter a maintenance facility to have this type of work performed. In previous approaches, the entire machine was taken apart to make certain that all parts were new and working. Unfortunately, these previous approaches were costly and time-consuming to undertake since the machine always had to be disassembled, and since machines were often complex and are constructed of many parts. Additionally, when parts were automatically discarded, many good parts were often thrown away as a result of, e.g., standardized maintenance procedures, thereby wasting additional resources.

All of these problems have led to general user dissatisfaction with previous approaches.

BRIEF DESCRIPTION OF THE INVENTION

The present invention is directed to achieve the efficient and cost-effective maintenance of industrial machines that are typically constructed of multiple components. In some embodiments, the invention described herein examines the historic genealogy of components of a machine, and the layout of a machine to identify components of the machine that need to be replaced (and possibly when) based on component characteristics, overall machine characteristics, service history of both the machine and the components, service requirements of both the machine and the components, or operating life of the machine and components, to mention a few factors.

By taking into account machine- and component-specific data, operating and service history, manufacturing data and other related information, the maintenance schedules determined by embodiments of the present invention are optimized. As a result and advantageously, the entire machine need not necessarily be torn apart when maintenance is required, thereby saving time to complete machine maintenance and reducing maintenance costs. Embodiments described herein are made possible through the use of machine and/or component data available through, e.g., sensing devices that may be optionally analyzed using a computerized industrial internet of things analytics platform that serves as a repository of historical component, machine, maintenance and/or manufacturing information that may be deployed at the location of the manufacturing process, at the manufacturing facility premise or in the cloud.

In some of these embodiments, a machine part number of an industrial machine is scanned (or otherwise obtained) when the machine enters a facility for maintenance. The scanned (or obtained) number is associated with components that comprise the machine and with characteristics of the components or machine. Based upon the characteristics of the machine or components, a customized maintenance route is produced for the machine through the facility. The customized maintenance route specifies a sequence of maintenance actions and, in aspects, the timing of these actions for the machine that are adjusted in real-time as the characteristics change.

In aspects, each of the characteristics is weighted. In other examples, the route is graphically displayed to a user.

In examples, the analysis and creation of a maintenance schedule occurs at the cloud. In other examples, the analysis and creation of the maintenance schedule occurs at a service center that is not located at the cloud.

In other aspects, the characteristics may be machine layout, a service history of the component, a service history of the machine, service requirements of the machine, service requirements of the component, operating life of the machine, or operating characteristic of the component. Other examples are possible.

In other examples, the analysis determines when components of the machine need to be replaced and this is included in the schedule. In aspects, the whole machine need not be completely disassembled during maintenance of the machine. Advantageously, this reduces maintenance time and costs associated with the machine.

In others of these embodiments, an apparatus includes an interface and a control circuit. The interface includes an input and an output. The input is configured to receive a scanned (or otherwise obtained) machine part number of an industrial machine when the machine enters a facility for maintenance. The control circuit is coupled to the interface. The control circuit is configured to associate the scanned number with components that comprise the machine, and with characteristics of the components or machine. The control circuit is further configured to, based upon the characteristics of the machine or components, produce a customized maintenance route for the machine through the facility. The customized maintenance route specifies a sequence of maintenance actions and timing of these actions for the machine that are adjusted in real-time as the characteristics change.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The present approaches examine the genealogy or maintenance history of components of a machine, and the layout of a machine to see what components of the machine need to be replaced, and in some aspects the timing of the replacement based upon component characteristics, overall machine characteristics, service history of both machine and component characteristics, service requirements of both machine and component characteristics, or operating life of the machine or components, to mention a few factors. Advantageously, the entire machine need not be torn apart when maintenance is required, thereby saving time required to do the maintenance and reducing the costs for maintaining the machine.

In one example, the machine part number is scanned when the machine enters a facility for maintenance. In other examples, the machine part number may be obtained in other ways such as by a human operator manually entering the part number. The number is associated with components that comprise the machine, along with a maintenance history of these components.

In aspects, a customized route describing the path of the machine through a maintenance facility is produced. The route specifies a sequence of maintenance actions and is adjusted in real-time based on the history of machine components. For example, if a component was replaced one month ago, any steps involving replacing that component may be skipped (since it can be assumed that the component is new and does not need to be replaced). In other aspects, the route may be graphically displayed on screens to users. In still other aspects, the analysis may occur at the cloud or may be performed at the same facility as the machine.

It will be appreciated that it is typically time consuming and costly to take machines and all their components apart when performing maintenance. Good parts are sometimes thrown away, and this is costly and wasteful of resources. The present approaches eliminate or alleviate these and other problems associated with previous approaches.

Figure 1:
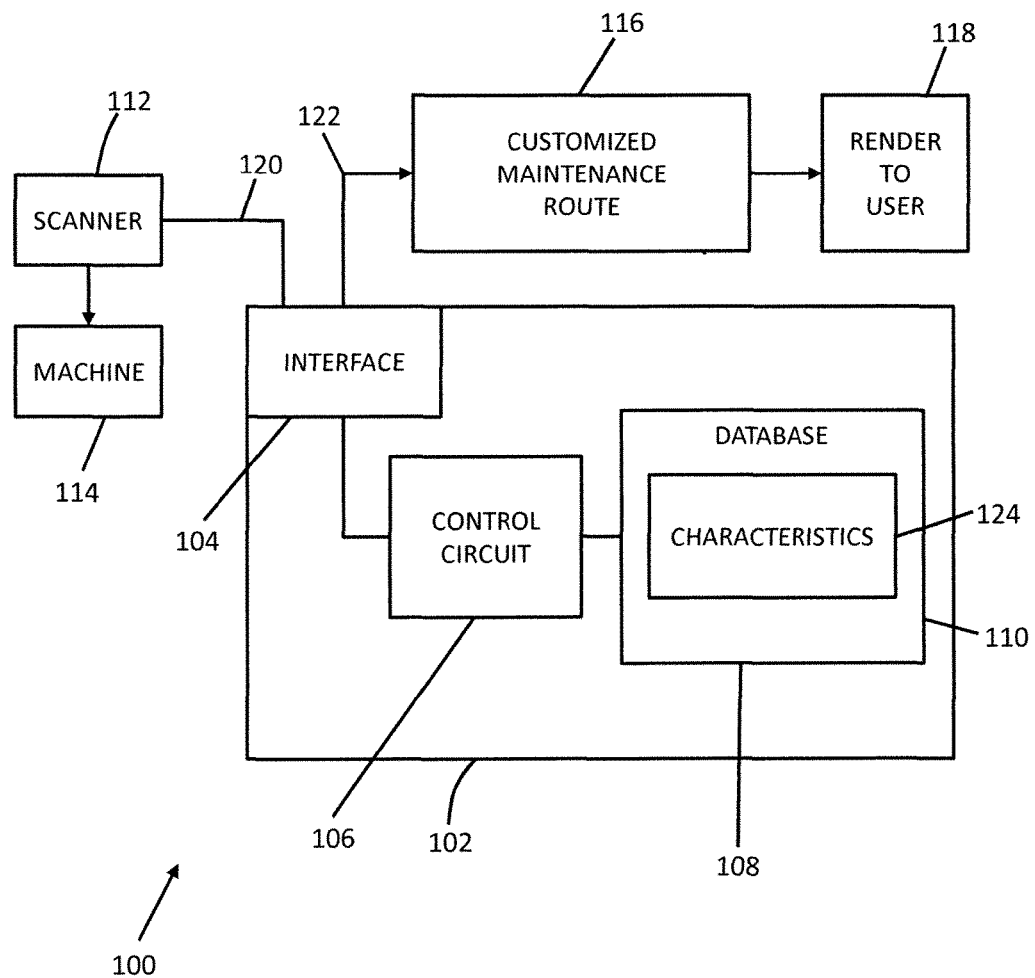
FIG. 1 comprises a block diagram of a system and apparatus for maintaining a machine according to various embodiments of the present invention.

Referring now to FIG. 1, a system 100 includes an apparatus 102, a scanner 112, and a machine 114. The apparatus 102 includes an interface 104, a control circuit 106, and a database 108. The interface 104 includes an input 120 and an output 122. The control circuit is coupled to the interface 104 and the database 108.

The scanner 112 is any device that scans, senses, or identifies the part number of the machine 114. In aspects, the scanner 112 may scan labels on the machine 114 (or the components of the machine 114). For example, the scanner 112 may be a bar code scanner (and the machine or parts have associated labels with barcodes), or the scanner 112 may be an RFID tag reader (and the machine 114 or the components of the machine have RFID tags). The scanner 112 may be hand-held, or may be fixed in location. The scanner 112 may wirelessly transmit the scanned information to the apparatus 102, or the scanner 112 may transmit the information over a wired link.

In other aspects, the part number of the machine 114 can be entered into the system 100 by an alternative mechanism. For example, a human operator may enter the part number of the machine 114 manually via a graphical user interface (such as those associated with a personal computer, smart phone, or tablet). Other mechanisms and approaches for obtaining the part number may also be used.

The machine 114 may be any type of industrial machine (or any other type of machine). In examples, the machine 114 may be a grinder, a milling machine, a saw, or a capper that may be used in a production or assembly line. In other examples, the machine may be a wind turbine or other type of machine that is used in a grouping (e.g., wind farm) of machines. The machine 114 may have sensors that gather and transmit data. For example, the machine 114 may have sensors that measure and transit time series data to the apparatus 102 (or some other processing or analysis device) for analysis. (e.g., predicting the operation of the machine 114).

The interface 104 performs conversion functions between the control circuit 106 and the output of the apparatus 102. For example, data may be converted between analog and digital formats. The interface 104 is also configured to transmit and receive information, and may be structured with buffers, transmitter circuitry, and receiver circuitry. The interface 104 may be implemented as any combination of computer hardware and software.

The control circuit 106 is also any combination of computer hardware and/or computer software. In one example, the control circuit 106 is a microprocessor that executes computer instructions stored in a memory.

The database 108 may be any type of memory storage device. In aspects, the database 108 may be combinations of permanent or temporary memory.

In one example of the operation of the system of FIG. 1, the input 120 is configured to receive a scanned machine part number of an industrial machine 106 when the machine enters a facility for maintenance. The control circuit 106 is configured to associate the scanned number with components that comprise the machine 114 and with characteristics 124 (stored in the database 108) of the components or machine 114. The control circuit 106 is also configured to, based upon the characteristics of the machine 114 or components, produce a customized maintenance route 116 for the machine through the facility.

The customized maintenance route 116 specifies a sequence of maintenance actions and in some aspects the timing of these actions for the machine 114. The sequence and/or the timing are adjusted in real-time as the characteristics change. In one example, a customized route 116 describes the path of the machine through a maintenance facility. The route specifies a sequence of maintenance actions and is adjusted in real-time based on the history of machine components. For example, if a component was replaced one month ago, any steps involving replacing that component may be skipped (since it can be assumed that the component is new and does not need to be replaced). The layout of the machine may also be considered in determining the schedule, for example, by scheduling the maintenance to minimize machine disruption.

At step 118, the sequence of actions in a maintenance sequence is rendered to a user. The rendering may be a graphical rendering on a computer display screen. The screen may be associated with any type of device and may also be made on multiple devices and on multiple formats. For example, the rendering may occur on a portable electronic device (e.g., a smart phone or tablet) of a user or may be made on a device with a fixed location (e.g., a personal computer). The schedule can be sent to these devices where these devices are located at the location of the machine 114. In other examples, the schedule can be sent to the cloud, or through another network to a home office or other central monitoring location.

Figure 2:
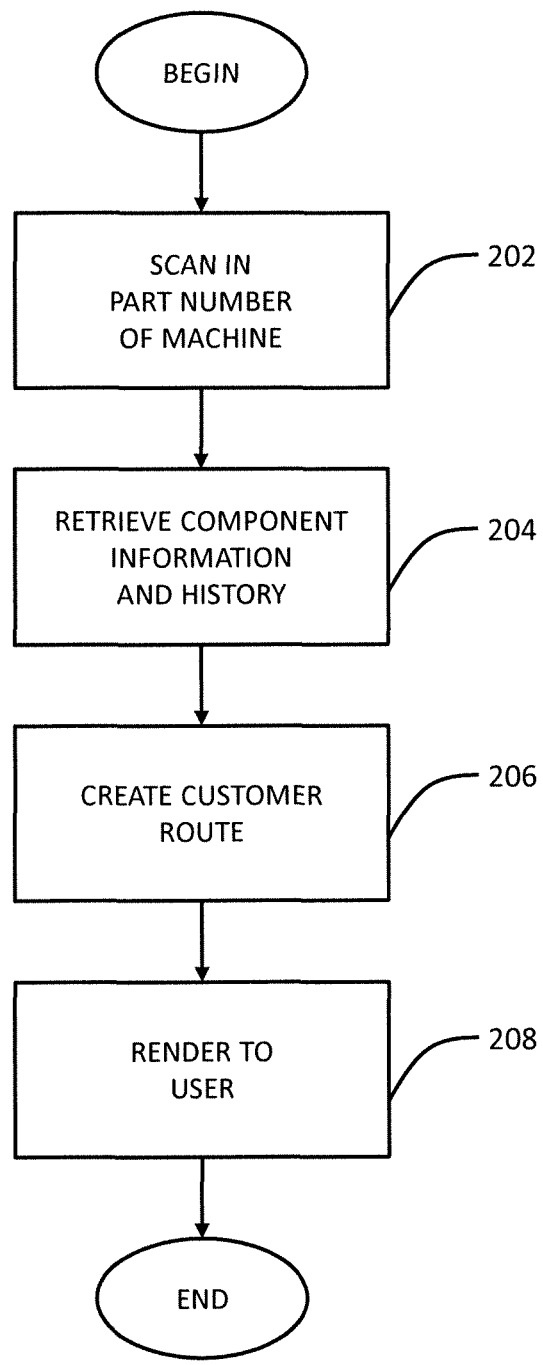
FIG. 2 comprises a flowchart of one approach for maintaining a machine according to various embodiments of the present invention.

Referring now to FIG. 2, one example of an approach for maintaining a machine is described. At step 202, a machine part number of an industrial machine is scanned when the machine enters a facility for maintenance. In other examples, the part number may be manually entered via a user interface.

At step 204, component information and history is retrieved. In aspects, the scanned number is associated with components that comprise the machine and with characteristics of the components or machine. In examples, the characteristics may be machine layout, a service history of the component, a service history of the machine, service requirements of the machine, service requirements of the component, operating life of the machine, or operating characteristic of the component. Other examples are possible.

At step 206, based upon the characteristics of the machine or components, a customized maintenance route is produced for the machine through the facility. The customized maintenance route specifies a sequence of maintenance actions and, in some aspects, the timing of these actions for the machine that are adjusted in real-time as the characteristics change. In aspects, each of the characteristics is weighted in the analysis.

At step 208, the route is rendered to a user. In aspect, the route may be rendered to the user on a computer screen. Other actions can also be taken. For example, parts can be ordered, alerts can be sent (that alert supervisory personnel of performance issues), and the operation of the assembly line or grouping of machines can be adjusted to take into account the maintenance schedule (and, in some aspects, the timing of when the actions in the schedule are performed) being performed.

As mentioned, the timing of when components of the machine need to be replaced may also be determined. For example, a prediction may be made (e.g., based upon the analysis) of how long a particular component will be operable before the component becomes inoperable. In this way, a decision may be made to wait to replace a particular component rather than always replace a component.

In examples, the various steps described above are performed at the cloud. In other examples, the steps may be performed at the facility, or in the area where the machine is located (e.g., at the factory if the machine is an industrial machine, or at the wind farm if the machine is a windmill).

Figure 3:
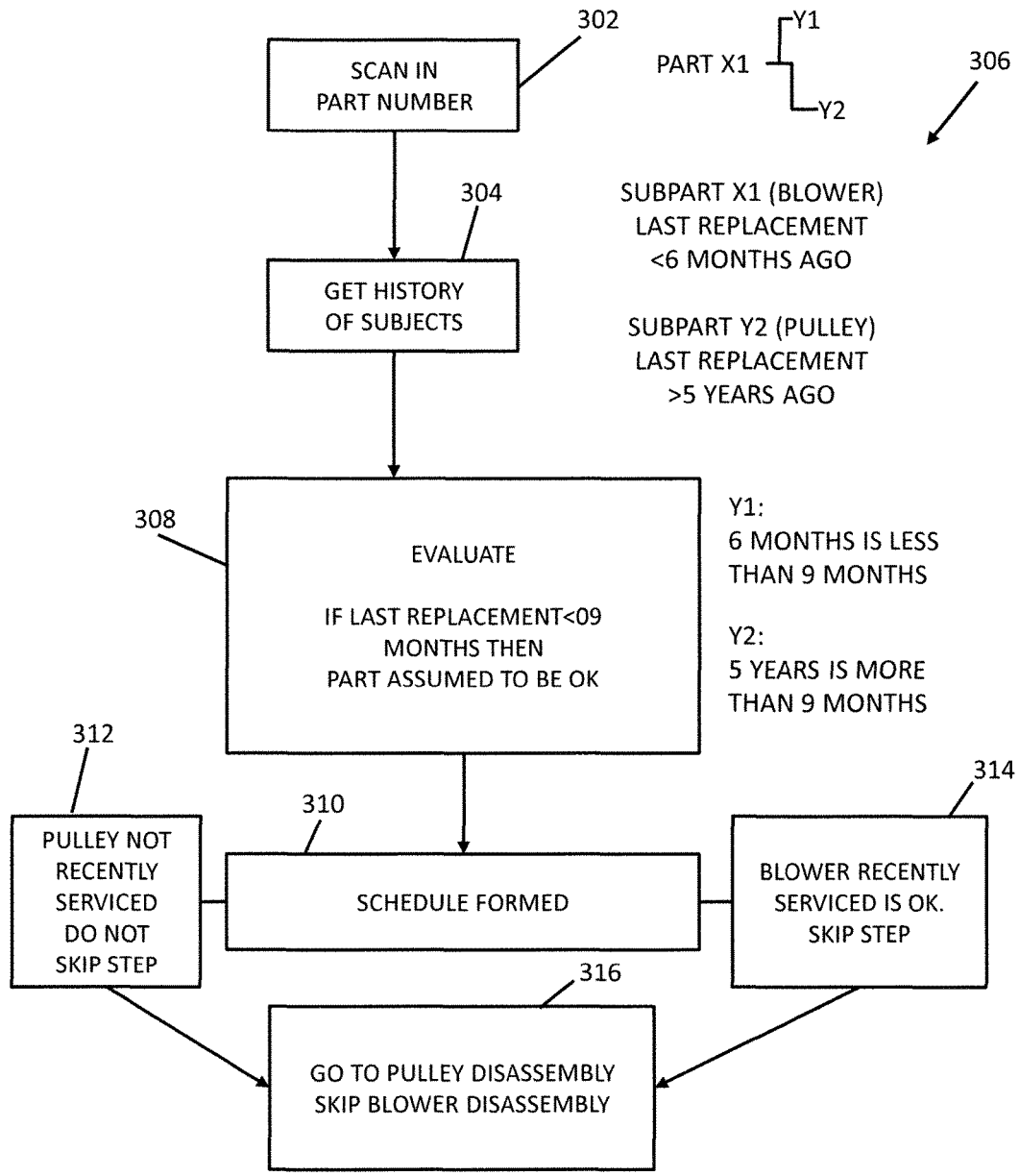
FIG. 3 comprises a flowchart of an approach for producing a schedule that maintains a machine according to various embodiments of the present invention.

Referring now to FIG. 3, one example of producing a customized route of a machine through a maintenance facility is described. Many or all of the steps of FIG. 3 may be implemented by a control circuit (e.g., the control circuit 106 of FIG. 1).

At step 302, the part number of the machine is scanned in by using some type of scanning device. Alternatively, the part number may also be manually entered by a human operator. The scanning device may be any type of scanning device such as a scanner capable of detecting and determining bar codes. In this example, the scan indicates a part number for the machine of X1 and the machine has two components Y1 (a blower) and Y2 (a pulley).

At step 304, the history 306 of the parts Y1 and Y2 is retrieved from a database (e.g., the database 108 of FIG. 1). The history 306 may be described by any type of data structure or combination of data elements in any type of format or computer language.

In this example, the history 306 indicates that subpart Y1 (the blower) was replaced less than 6 months ago. In aspects, the history 306 may also indicate the date that subpart Y1 was replaced.

Additionally, the history 306 indicates the subpart Y2 (the pulley) was replaced more than five years ago. In aspects, the history 306 may also indicate the date that subpart Y2 was replaced.

At step 308, an evaluation is performed. The goal of the evaluation is to determine, based upon the history 306, whether a particular part should be replaced. Additionally, the evaluation determines a schedule or sequence of maintenance actions to be performed as the machine passes through a maintenance facility.

In the present example, the maintenance facility includes or is organized into a sequence of stations or maintenance areas. These stations specialize in the replacement of certain parts or group of parts of the machine. By carefully crafting the schedule based upon the history of the components (and possibly other factors such as machine layout), it is possible (and in many cases likely) that the machine need not proceed to each of the stations. Unlike previous approaches, the approaches described herein do not mandate that the entire machine be disassembled during maintenance of the machine, thereby reducing the time and decreasing the cost of maintenance operations.

Returning now to step 308, a determination is made as to whether a replacement to a part has been made less than 9 months ago. If the answer to this step is affirmative, then it is assumed that the part is acceptable and need not be replaced. In the present case, part Y1 was replaced less than 9 months ago (6 months ago). Part Y2 was, however, replaced more than 9 months ago (5 years ago).

At step 310, a schedule or sequence of operations is formed. At step 312, it is determined that part Y2 (the pulley) was not recently serviced and needs to be replaced. At step 314, it is determined that part Y1 (the blower) was recently serviced and need not be replaced.

At step 316, the schedule is implemented. In this case, the schedule specifies that the machine should be transmitted to the pulley disassembly area, but should not go to the blower disassembly area.

It will be appreciated that the example of FIG. 3 is only one example of an approach for determining a maintenance schedule, and that other examples are possible. For example, various factors besides the time since a part was replaced can also be evaluated. These characteristics can include historical characteristics (e.g., the time since a part was replaced) and other characteristics such as machine layout, the service history of the machine, the service requirements of the machine, the service requirements of the component, the operating life of the machine, or the operating characteristic of the component. Other examples are possible.

The various characteristics can be weighted in determining the maintenance schedule. For example, service history (the time since a component was replaced) may be given a higher weighting factor in determining whether to replace a component than the machine layout (when these two factors are used in determining a maintenance schedule). In other examples, the machine layout is weighted higher than the service history.

It will also be understood that the schedules produced can be altered in real-time and on-the-fly. For instance, as the machines enter a facility schedules can be developed. In aspects, these schedules can be dynamically changed and updated as the machine moves through a factory.

In one example, operator availability (to disassemble a machine and replace a part) is a factor in determining a schedule. Consequently, whether the part is to be replaced and when the part is to be replaced can be dynamically altered in real-time as the machine proceeds through a maintenance facility based upon operator availability.

Figure 4:
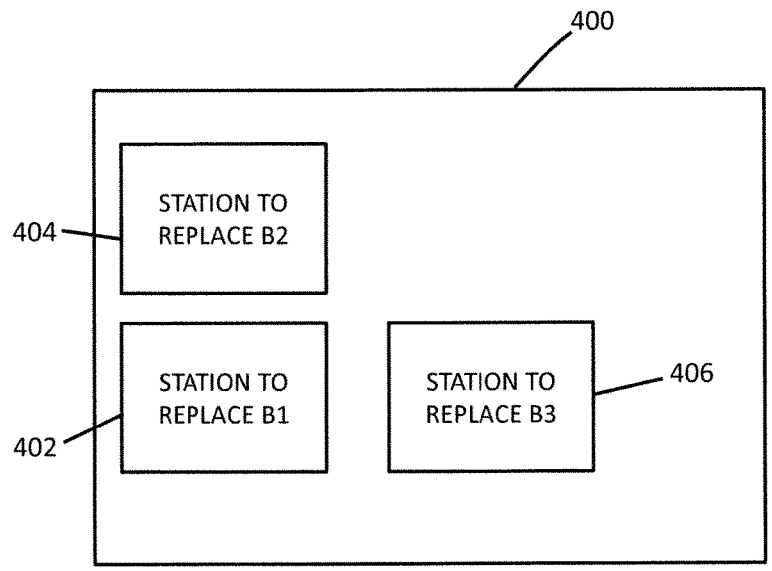
FIG. 4 comprises a block diagram showing a maintenance facility and schedules for a machine passing through this facility according to various embodiments of the present invention.
Figure 4:
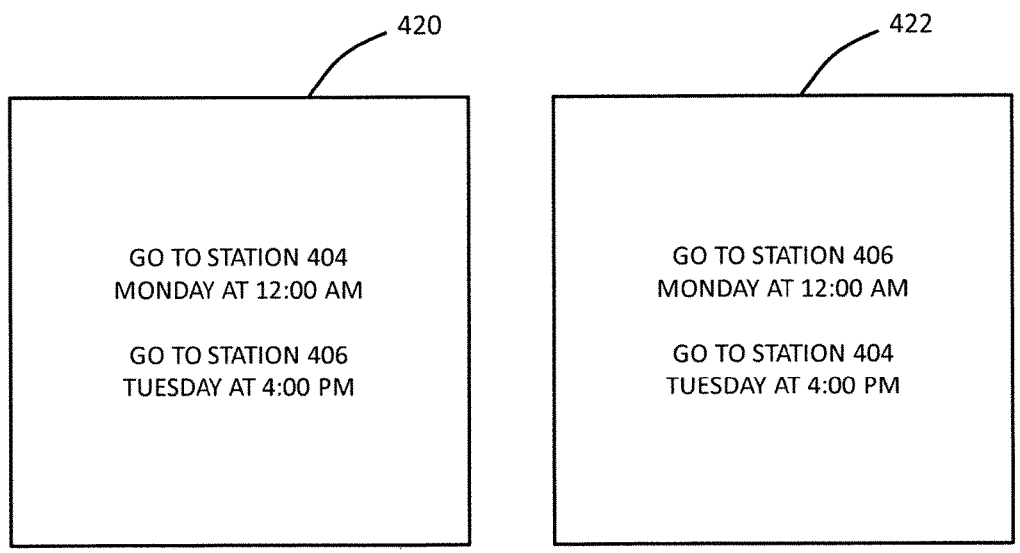

Referring now to FIG. 4, one example of a dynamically changing schedule is described. This example describes a maintenance schedule for a machine A1 having components B1, B2, and B3. The present example assumes service history and operator availability are the factors used in determining a maintenance schedule, and that these factors are weighted equally.

More specifically, a maintenance facility 400 includes maintenance stations 402, 404, and 406. Each of these stations is operated by a human operator. Station 402 in the facility 400 replaces part B1. Station 404 replaces part B2. Station 406 replaces part B3.

An analysis produces maintenance schedules, which can be rendered on a display screen (e.g., at a smart phone or personal computer). It will be appreciated that other actions may also occur. For instance, once the scheduled actions can occur to implement the schedule (e.g., send an alert to an operator to report to a station to perform maintenance on the machine).

An initial schedule 420 is formed at time t1 when the machine enters the facility 400 and based upon an analysis of the service history determines that the machine A1 should go to station 404 (to replace part B2) at 12:00 am on Monday, and go to station 406 (to replace part B3) Tuesday at 4:00 pm. An analysis determines that the part B1 was recently replaced and thus need not be replaced now, while the other parts B2 and B3 have not recently been replaced and should be replaced now.

However, after entering the facility 400 on Sunday at 12:00 am, information is received where the operator of station 404 is not available on Monday, but is available on Tuesday (and the station 404 is also available at this time). A check reveals that the operator of station 406 is available on Monday (and station 406 is also available at this time). A determination is made to dynamically change the order of the operation as shown in schedule 422. In the schedule 422, the machine A1 should go to station 406 (to replace part B3) at 12:00 am on Monday, and go to station 404 (to replace part B2) Tuesday at 4:00 pm.

Thus, the schedules 420 and 422 are altered in real-time and on-the-fly. As operator availability (to disassemble a machine and replace a part) changes, the schedule changes even after the machine enters the facility 400. It will be appreciated that the example shown in FIG. 4 is one example, and that other examples that utilize a wide variety of other factors are possible and can be used.

As mentioned, the approaches described herein may optionally be implemented using a computerized industrial interne of things analytics platform that may be deployed at the location of the manufacturing process, at the manufacturing facility premise or in the cloud.

While progress with industrial equipment automation has been made over the last several decades, and assets have become "smarter," the intelligence of any individual asset pales in comparison to intelligence that can be gained when multiple smart devices are connected together. Aggregating data collected from or about multiple assets can enable users to improve business processes, for example by improving effectiveness of asset maintenance, or improving operational performance if appropriate industrial-specific data collection and modeling technology is developed and applied.

In an example, an industrial asset can be outfitted with one or more sensors configured to monitor respective ones of an asset's operations or conditions. Data from the one or more sensors can be recorded or transmitted to a cloud-based or other remote computing environment. By bringing such data into a cloud-based computing environment, new software applications informed by industrial process, tools and know-how can be constructed, and new physics-based analytics specific to an industrial environment can be created. Insights gained through analysis of such data can lead to enhanced asset designs, or to enhanced software algorithms for operating the same or similar asset at its edge, that is, at the extremes of its expected or available operating conditions.

The systems and methods for managing industrial machines (also referred to assets herein) can include or can be a portion of an Industrial Internet of Things (IIoT). In an example, an IIoT connects industrial assets, such as turbines, jet engines, and locomotives, to the Internet or cloud, or to each other in some meaningful way. The systems and methods described herein can include using a "cloud" or remote or distributed computing resource or service. The cloud can be used to receive, relay, transmit, store, analyze, or otherwise process information for or about one or more industrial assets. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

However, the integration of industrial assets with the remote computing resources to enable the IIoT often presents technical challenges separate and distinct from the specific industry and from computer networks, generally. A given industrial asset may need to be configured with novel interfaces and communication protocols to send and receive data to and from distributed computing resources. Given industrial assets may have strict requirements for cost, weight, security, performance, signal interference, and the like such that enabling such an interface is rarely as simple as combining the industrial asset with a general purpose computing device.

To address these problems and other problems resulting from the intersection of certain industrial fields and the IIoT, embodiments may enable improved interfaces, techniques, protocols, and algorithms for facilitating communication with and configuration of industrial assets via remote computing platforms and frameworks. Improvements in this regard may relate to both improvements that address particular challenges related to particular industrial assets (e.g., improved aircraft engines, wind turbines, locomotives, medical imaging equipment) that address particular problems related to use of these industrial assets with these remote computing platforms and frameworks, and also improvements that address challenges related to operation of the platform itself to provide improved mechanisms for configuration, analytics, and remote management of industrial assets.

The Predix™ platform available from GE is a novel embodiment of such Asset Management Platform (AMP) technology enabled by state of the art cutting edge tools and cloud computing techniques that enable incorporation of a manufacturer's asset knowledge with a set of development tools and best practices that enables asset users to bridge gaps between software and operations to enhance capabilities, foster innovation, and ultimately provide economic value. Through the use of such a system, a manufacturer of industrial assets can be uniquely situated to leverage its understanding of industrial assets themselves, models of such assets, and industrial operations or applications of such assets, to create new value for industrial customers through asset insights.

Figure 5:
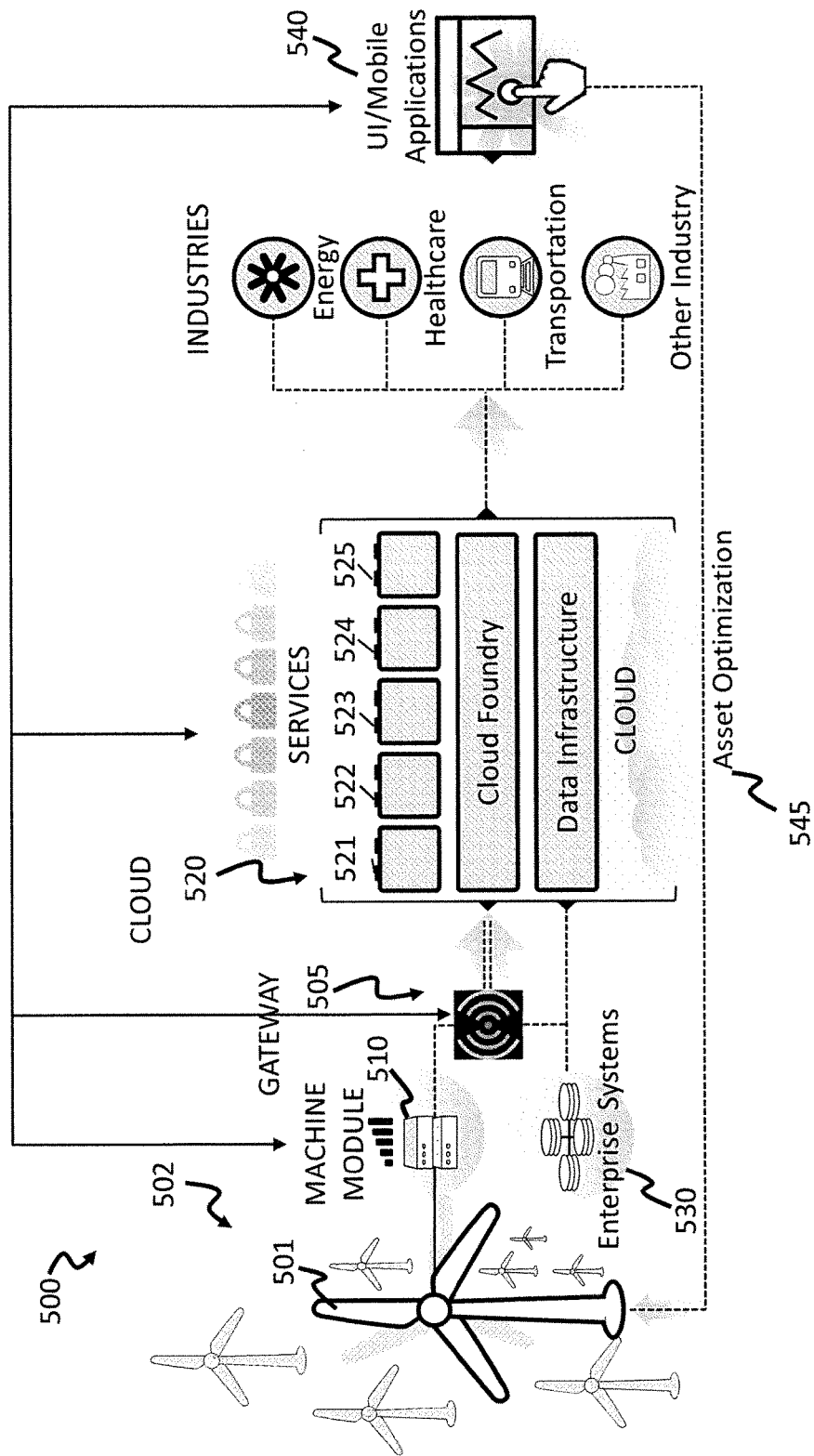
FIG. 5 comprises a block diagram showing an implementation for a system for maintaining a machine according to various embodiments of the present invention.

FIG. 5 illustrates generally an example of portions of a first AMP 500. As further described herein, one or more portions of an AMP can reside in an asset cloud computing system 520, in a local or sandboxed environment, or can be distributed across multiple locations or devices. An AMP can be configured to perform any one or more of data acquisition, data analysis, or data exchange with local or remote assets, or with other task-specific processing devices.

The first AMP 500 includes a first asset community 502 that is communicatively coupled with the asset cloud computing system 520. In an example, a machine module 510 receives information from, or senses information about, at least one asset member of the first asset community 502, and configures the received information for exchange with the asset cloud computing system 520. In an example, the machine module 510 is coupled to the asset cloud computing system 520 or to an enterprise computing system 530 via a communication gateway 505.

In an example, the communication gateway 505 includes or uses a wired or wireless communication channel that extends at least from the machine module 510 to the asset cloud computing system 520. The asset cloud computing system 520 includes several layers. In an example, the asset cloud computing system 520 includes at least a data infrastructure layer, a cloud foundry layer, and modules for providing various functions. In the example of FIG. 5, the asset cloud computing system 520 includes an asset module 521, an analytics module 522, a data acquisition module 523, a data security module 524, and an operations module 525. Each of the modules 521-525 includes or uses a dedicated circuit, or instructions for operating a general purpose processor circuit, to perform the respective functions. In an example, the modules 521-525 are communicatively coupled in the asset cloud computing system 520 such that information from one module can be shared with another. In an example, the modules 521-525 are co-located at a designated datacenter or other facility, or the modules 521-525 can be distributed across multiple different locations.

An interface device 540 can be configured for data communication with one or more of the machine modules 510, the gateway 505, or the asset cloud computing system 520. The interface device 540 can be used to monitor or control one or more assets. In an example, information about the first asset community 502 is presented to an operator at the interface device 540. The information about the first asset community 502 can include information from the machine module 510, or the information can include information from the asset cloud computing system 520. In an example, the information from the asset cloud computing system 520 includes information about the first asset community 502 in the context of multiple other similar or dissimilar assets, and the interface device 540 can include options for optimizing one or more members of the first asset community 502 based on analytics performed at the asset cloud computing system 520.

In an example, an operator selects a parameter update for the first wind turbine 501 using the interface device 540, and the parameter update is pushed to the first wind turbine via one or more of the asset cloud computing system 520, the gateway 505, and the machine module 510. In an example, the interface device 540 is in data communication with the enterprise computing system 530 and the interface device 540 provides an operation with enterprise-wide data about the first asset community 502 in the context of other business or process data. For example, choices with respect to asset optimization can be presented to an operator in the context of available or forecasted raw material supplies or fuel costs. In an example, choices with respect to asset optimization can be presented to an operator in the context of a process flow to identify how efficiency gains or losses at one asset can impact other assets. In an example, one or more choices described herein as being presented to a user or operator can alternatively be made automatically by a processor circuit according to earlier-specified or programmed operational parameters. In an example, the processor circuit can be located at one or more of the interface device 540, the asset cloud computing system 520, the enterprise computing system 530, or elsewhere.

Returning again to the example of FIG. 5, some capabilities of the first AMP 500 are illustrated. The example of FIG. 5 includes the first asset community 502 with multiple wind turbine assets, including the first wind turbine 501. Wind turbines are used in some examples herein as non-limiting examples of a type of industrial asset that can be a part of, or in data communication with, the first AMP 500.

In an example, the multiple turbine members of the asset community 502 include assets from different manufacturers or vintages. The multiple turbine members of the asset community 502 can belong to one or more different asset communities, and the asset communities can be located locally or remotely from one another. For example, the members of the asset community 502 can be co-located on a single wind farm, or the members can be geographically distributed across multiple different farms. In an example, the multiple turbine members of the asset community 502 can be in use (or non-use) under similar or dissimilar environmental conditions, or can have one or more other common or distinguishing characteristics.

FIG. 5 further includes the device gateway 505 configured to couple the first asset community 502 to the asset cloud computing system 520. The device gateway 505 can further couple the asset cloud computing system 520 to one or more other assets or asset communities, to the enterprise computing system 530, or to one or more other devices. The first AMP 500 thus represents a scalable industrial solution that extends from a physical or virtual asset (e.g., the first wind turbine 501) to a remote asset cloud computing system 520. The asset cloud computing system 520 optionally includes a local system, enterprise, or global computing infrastructure that can be optimized for industrial data workloads, secure data communication, and compliance with regulatory requirements.

In an example, information from an asset, about the asset, or sensed by an asset itself is communicated from the asset to the data acquisition module 524 in the asset cloud computing system 520. In an example, an external sensor can be used to sense information about a function of an asset, or to sense information about an environment condition at or near an asset. The external sensor can be configured for data communication with the device gateway 505 and the data acquisition module 524, and the asset cloud computing system 520 can be configured to use the sensor information in its analysis of one or more assets, such as using the analytics module 522.

In an example, the first AMP 500 can use the asset cloud computing system 520 to retrieve an operational model for the first wind turbine 501, such as using the asset module 521. The model can be stored locally in the asset cloud computing system 520, or the model can be stored at the enterprise computing system 530, or the model can be stored elsewhere. The asset cloud computing system 520 can use the analytics module 522 to apply information received about the first wind turbine 501 or its operating conditions (e.g., received via the device gateway 505) to or with the retrieved operational model. Using a result from the analytics module 522, the operational model can optionally be updated, such as for subsequent use in optimizing the first wind turbine 501 or one or more other assets, such as one or more assets in the same or different asset community. For example, information about the first wind turbine 501 can be analyzed at the asset cloud computing system 520 to inform selection of an operating parameter for a remotely located second wind turbine that belongs to a different second asset community.

The first AMP 500 includes a machine module 510. The machine module 510 includes a software layer configured for communication with one or more industrial assets and the asset cloud computing system 520. In an example, the machine module 510 can be configured to run an application locally at an asset, such as at the first wind turbine 501. The machine module 510 can be configured for use with or installed on gateways, industrial controllers, sensors, and other components. In an example, the machine module 510 includes a hardware circuit with a processor that is configured to execute software instructions to receive information about an asset, optionally process or apply the received information, and then selectively transmit the same or different information to the asset cloud computing system 520.

In an example, the asset cloud computing system 520 can include the operations module 525. The operations module 525 can include services that developers can use to build or test Industrial Internet applications, or the operations module 525 can include services to implement Industrial Internet applications, such as in coordination with one or more other AMP modules. In an example, the operations module 525 includes a microservices marketplace where developers can publish their services and/or retrieve services from third parties. The operations module 525 can include a development framework for communicating with various available services or modules. The development framework can offer developers a consistent look and feel and a contextual user experience in web or mobile applications.

In an example, an AMP can further include a connectivity module. The connectivity module can optionally be used where a direct connection to the cloud is unavailable. For example, a connectivity module can be used to enable data communication between one or more assets and the cloud using a virtual network of wired (e.g., fixed-line electrical, optical, or other) or wireless (e.g., cellular, satellite, or other) communication channels. In an example, a connectivity module forms at least a portion of the gateway 505 between the machine module 510 and the asset cloud computing system 520.

In an example, an AMP can be configured to aid in optimizing operations or preparing or executing predictive maintenance for industrial assets. An AMP can leverage multiple platform components to predict problem conditions and conduct preventative maintenance, thereby reducing unplanned downtimes. In an example, the machine module 510 is configured to receive or monitor data collected from one or more asset sensors and, using physics-based analytics (e.g., finite element analysis or some other technique selected in accordance with the asset being analyzed), detect error conditions based on a model of the corresponding asset. In an example, a processor circuit applies analytics or algorithms at the machine module 510 or at the asset cloud computing system 520.

In response to the detected error conditions, the AMP can issue various mitigating commands to the asset, such as via the machine module 510, for manual or automatic implementation at the asset. In an example, the AMP can provide a shut-down command to the asset in response to a detected error condition. Shutting down an asset before an error condition becomes fatal can help to mitigate potential losses or to reduce damage to the asset or its surroundings. In addition to such an edge-level application, the machine module 510 can communicate asset information to the asset cloud computing system 520.

In an example, the asset cloud computing system 520 can store or retrieve operational data for multiple similar assets. Over time, data scientists or machine learning can identify patterns and, based on the patterns, can create improved physics-based analytical models for identifying or mitigating issues at a particular asset or asset type. The improved analytics can be pushed back to all or a subset of the assets, such as via multiple respective machine modules 510, to effectively and efficiently improve performance of designated (e.g., similarly-situated) assets.

In an example, the asset cloud computing system 520 includes a Software-Defined Infrastructure (SDI) that serves as an abstraction layer above any specified hardware, such as to enable a data center to evolve over time with minimal disruption to overlying applications. The SDI enables a shared infrastructure with policy-based provisioning to facilitate dynamic automation, and enables SLA mappings to underlying infrastructure. This configuration can be useful when an application requires an underlying hardware configuration. The provisioning management and pooling of resources can be done at a granular level, thus allowing optimal resource allocation.

In a further example, the asset cloud computing system 520 is based on Cloud Foundry (CF), an open source PaaS that supports multiple developer frameworks and an ecosystem of application services. Cloud Foundry can make it faster and easier for application developers to build, test, deploy, and scale applications. Developers thus gain access to the vibrant CF ecosystem and an ever-growing library of CF services. Additionally, because it is open source, CF can be customized for IIoT workloads.

The asset cloud computing system 520 can include a data services module that can facilitate application development. For example, the data services module can enable developers to bring data into the asset cloud computing system 520 and to make such data available for various applications, such as applications that execute at the cloud, at a machine module, or at an asset or other location. In an example, the data services module can be configured to cleanse, merge, or map data before ultimately storing it in an appropriate data store, for example, at the asset cloud computing system 520. A special emphasis has been placed on time series data, as it is the data format that most sensors use.

Security can be a concern for data services that deal in data exchange between the asset cloud computing system 520 and one or more assets or other components. Some options for securing data transmissions include using Virtual Private Networks (VPN) or an SSL/TLS model. In an example, the first AMP 500 can support two-way TLS, such as between a machine module and the security module 524. In an example, two-way TLS may not be supported, and the security module 524 can treat client devices as OAuth users. For example, the security module 524 can allow enrollment of an asset (or other device) as an OAuth client and transparently use OAuth access tokens to send data to protected endpoints.

In the example of FIG. 5, it will be understood that the approaches described herein with respect to FIGS. 1-4 may be implemented using the AMP 500, which may be deployed at the first asset community 502, at the wind turbine 501, or in the cloud 520. In one example, the apparatus 102 of FIG. 1 may be deployed at any of these locations.

It will be appreciated by those skilled in the art that modifications to the foregoing embodiments may be made in various aspects. Other variations clearly would also work, and are within the scope and spirit of the invention. It is deemed that the spirit and scope of that invention encompasses such modifications and alterations to the embodiments herein as would be apparent to one of ordinary skill in the art and familiar with the teachings of the present application.

What is claimed is:

1. A method, comprising:
    scanning a machine part number of an industrial machine when the industrial machine is due for maintenance at a maintenance facility;
    wherein the industrial machine comprises a plurality of components;
    associating the scanned machine part number with the components of the industrial machine and with characteristics of the components or the industrial machine;
    based upon the characteristics of the industrial machine or components, producing a customized maintenance route plan through the maintenance facility, the customized maintenance route plan specifying a routing, an order, a timing, and a sequence of maintenance actions for the industrial machine that are adjusted in real-time as the characteristics change;
    wherein the industrial machine moves through the maintenance facility according to the customized maintenance route, wherein the maintenance actions are performed on selected ones of the plurality of components of the industrial machine as the industrial machine moves through the maintenance facility, wherein the maintenance actions include replacing or repairing the selected ones of the components of the industrial machine such that the entire industrial machine need not be disassembled;
    wherein the maintenance route is further determined based upon a service history of the selected ones of the plurality of components of the industrial machine;
    wherein the service history includes information concerning whether the selected ones of the plurality of components are new or includes the time since the selected ones of the plurality of components were replaced;
    wherein one or more of the routing, the order, the sequence, and the timing of the customized maintenance route change as the service history of the selected ones of the plurality of components changes over time.

2. The method of claim 1, each of the characteristics is weighted.

3. The method of claim 1, wherein the route is graphically displayed to a user.

4. The method of claim 1, wherein the producing occurs at the cloud.

5. The method of claim 1 wherein the characteristics further comprise one or more of: machine layout, a service history of the industrial machine, service requirements of the industrial machine, service requirements of the component, operating life of the industrial machine, or an operating characteristic of the component.

6. The method of claim 1, wherein the industrial machine need not be completely disassembled during maintenance.

7. An apparatus, comprising:
    an interface with an input and an output, the input configured to receive a scanned machine part number of an industrial machine when the industrial machine is due for maintenance at a maintenance facility;
    wherein the industrial machine comprises a plurality of components;
    a control circuit coupled to the interface, the control circuit configured to associate the scanned machine part number with the components of the industrial machine and with characteristics of the components or the industrial machine, the control circuit configured to, based upon the characteristics of the industrial machine or components, produce a customized maintenance route plan through the facility, the customized maintenance route plan specifying a routing, an order, a timing, and a sequence of maintenance actions for the industrial machine that are adjusted in real-time as the characteristics change;
    wherein the industrial machine moves through the maintenance facility according to the customized maintenance route, wherein the maintenance actions are performed on selected ones of the plurality of components of the industrial machine as the industrial machine moves through the maintenance facility, wherein the maintenance actions include replacing or repairing the selected ones of the components of the industrial machine such that the entire industrial machine need not be disassembled;
    wherein the maintenance route is further determined based upon a service history of the selected ones of the plurality of components of the industrial machine;
    wherein the service history includes information concerning whether the selected ones of the plurality of components are new or includes the time since the selected ones of the plurality of components were replaced;
    wherein one or more of the routing, the order, the sequence, and the timing of the customized maintenance route change as the service history of the selected ones of the plurality of components changes over time.

8. The apparatus of claim 7, each of the characteristics is weighted.

9. The apparatus of claim 7, wherein the control circuit is configured to graphically display the route to a user via the output of the interface.

10. The apparatus of claim 7, wherein the control circuit and interface are deployed at the cloud.

11. The apparatus of claim 7 wherein the characteristics further comprise one or more of: machine layout, a service history of the industrial machine, service requirements of the industrial machine, service requirements of the component, operating life of the industrial machine, or an operating characteristic of the component.

12. The apparatus of claim 7, wherein the industrial machine need not be completely disassembled during maintenance.

\* \* \* \* \*